Feb. 1, 1927. 1,615,821
H. T. ANDERSON
CONNECTING BAR AND METHOD OF MAKING THE SAME
Filed Sept. 4, 1924
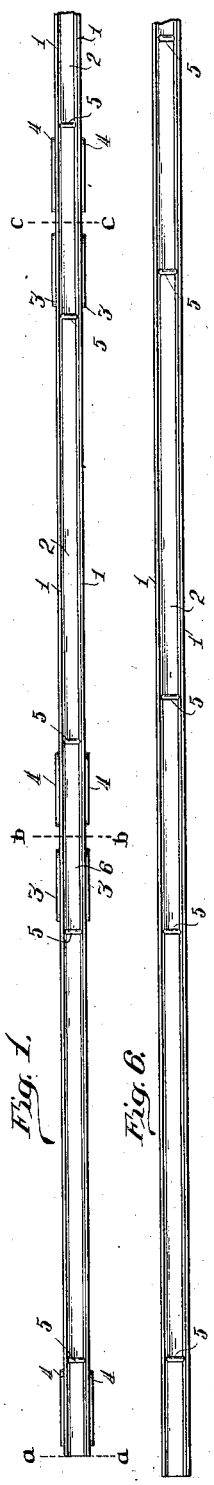
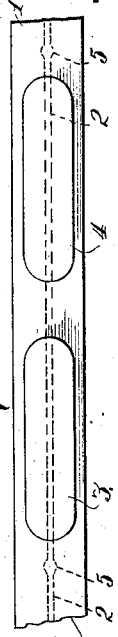
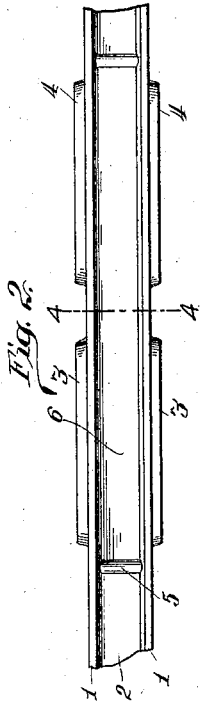
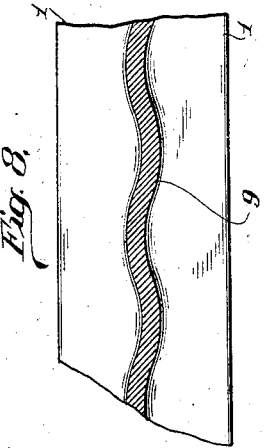
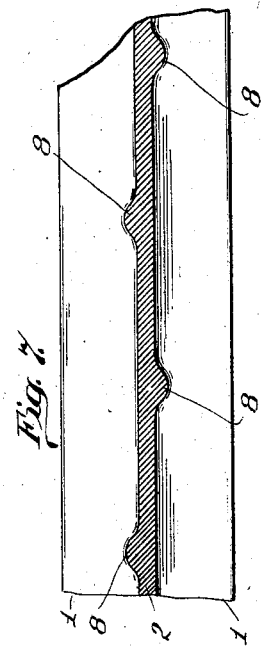
Inventor
Harry Temple Anderson
Barnett & Truman
Attorneys Patented Feb. 1, 1927.

1,615,821

UNITED STATES PATENT OFFICE.

HARRY TEMPLE ANDERSON, OF BUTLER, PENNSYLVANIA.

CONNECTING BAR AND METHOD OF MAKING THE SAME.

Application filed September 4, 1924. Serial No. 735,814.

This invention relates to an improved connecting bar, brake lever, or the like, and the method of making the same, these bars being particularly suitable for use in connection with railway brakes, and other portions of railway rolling stock.

The principal object of the invention is to simplify the process of manufacturing the bars, whereby a series of these connecting bars may be quickly and economically produced from a single rolled piece of metal, or angle beam, such as an I or H beam.

It has been the practice in the manufacture of such connecting bars, to weld the metal portions forming the end jaws, to the rod forming the body of the bar, and subsequently shape the bar and drill the necessary pivot holes in the end jaws. Another method has also been proposed, whereby the bars are formed from sections of angle beams, such as H-beams. These sections are cut somewhat longer than the length of the desired connecting bar, portions of the web are removed or displaced adjacent the ends of the bar, and the side flanges are upset (and thus shortened) to provide the necessary thickened reenforcement for the jaw members.

According to the present invention, a considerable length of angle beam is rolled with the necessary reenforcements for the jaw ends formed therein at intervals corresponding to the length of the connecting rods to be produced. The angle-beam is then divided into sections, by cutting it transversely between the several reenforced or thickened portions previously rolled therein, and the bars are already practically complete and of the proper length. To finish the bar it is only necessary to cut away the web between the jaws, and drill the pivot holes in the thickened die flange portions.

In the same original rolling process, the webs can be reenforced, if desired, by rolling transverse thickened portions therein at any desired intervals, or by corrugating the web continuously from end to end of the beam.

Other objects and advantages of the invention will apparent from the following detailed description of certain approved forms of connecting bars, and the processes by which they are produced.

In the accompanying drawings:

Fig. 1 is a plan view of a length of angle beam, rolled into the proper form for producing a series of these connecting bars.

Fig. 2 is a section of this beam on a larger scale, showing the reenforcements formed in the beam adjacent the ends of two of the bars to be produced therefrom.

Fig. 3 is a similar view, looking at Fig. 2 in the plane of the paper.

Fig. 4 is a transverse section, taken substantially on the line 4—4 of Fig. 2. This view is on a larger scale than Fig. 2.

Fig. 5 is a plan of one of the completed connecting bars.

Fig. 6 is a view similar to Fig. 1, showing the angle beam used in a modified form of the process.

Fig. 7 is an enlarged longitudinal central section through one of the beams, showing one type of re-enforcement that may be formed in the web of the beam at spaced intervals throughout its length.

Fig. 8 is a view similar to Fig. 7, illustrating the manner in which the web may be corrugated for reenforcing purposes.

In describing the preferred form of manufacture, reference will first be made to Figs. 1 to 5 inclusive. The angle beam shown in Fig. 1 is of a generally I- or H-form in cross section, comprising a pair of substantially parallel side flanges 1, and a connecting web 2. It is to be understood that any similar form of angle beam might be used, and in the following description and claims, whenever an H-beam is referred to, it is to be understood that this term contemplates the use of any similar form of angle beam, having substantially parallel side flanges and a connecting web.

This beam is not of uniform cross section from end to end, but is deformed at spaced intervals in the original rolling process or other method of manufacture, to provide reenforced or thickened portions in the side flanges and web as hereinafter described. In Fig. 1, the distance between any two of the lines a—a, b—b, or c—c, corresponds substantially to the length of one of the connecting bars to be produced.

Spaced symmetrically at each side of one of these division lines, such as b—b, pairs of thickened portions or reenforcements 3, 3 and 4, 4 are formed in the side flanges 1 of the beam. These reenforcements 3 or 4 are of sufficient thickness to provide the necessary additional strength in the jaw members of the clevis to be formed at the end of the connecting bar. Also reenforcing ribs or thickened portions 5 are formed in the web 2 adjacent those ends of the reenforcements 3 or 4 more remote from the adjacent pair of reenforcements. It is to be understood that all of these deformations or reenforcements are rolled or otherwise formed in the angle beams during its original process of manufacture.

To form the connecting bars, the angle beam is transversely severed along the line a—a, b—b, etc., each section cut off from the beam forming the stock for one of the connecting bars. This connecting bar will already be of the desired size and length. To complete the bar, it is only necessary to cut away those portions 6 of the web lying between the reenforced side flanges 3 or 4, and extending from the ends of the bar inwardly to the reenforcements 5. The reenforcing bar will then be in the completed form shown in Fig. 5. The pivot-holes 7 are then drilled through the reenforced jaws 3 or 4, and the connecting bar is ready for use.

If additional reenforcement or strengthening of rib 2 is desired, transverse ribs or thickened portions 8, (see Fig. 7) may be rolled into the web 2 at any desired intervals during the original process of manufacture. According to another method, the web may be transversely corrugated, as shown at 9, Fig. 8, from end to end thereof.

For producing the deformed angle beam, a somewhat more complicated rolling mechanism is required than has heretofore been used but once this mechanism is provided the angle beam stock can be quickly and economically produced. The completion of the connecting bars from this stock is extremely simple. It is only necessary to cut the angle beams into sections at the proper points, and no upsetting or stamping process is required. The extra web portions at the bar ends are then cut away, and the holes formed in the jaws, and the connecting bar is complete. These bars are very strong and rigid, and their stiffness may be amplified if desired, by originally providing the angle beam stock with rib reenforcements, such as illustrated in Figs. 7 and 8.

In a modified form of this process, the bars may be formed from angle-beam stock of the type shown in Fig. 6. In this beam the reenforcements 5, (and if desired, the reenforcements 8 or 9), are rolled or formed in the web, but the reenforced portions 3 and 4 of the side flanges are omitted. It will be noted that the adjacent ribs 5 are spaced further apart than in the beam shown in Fig. 1, as with this process some additional metal is required for the upsetting process by which the jaws are formed.

The angle beam is then cut into sections at points midway between adjacent ribs 5, and the web removed between each rib 5 and the end of the bar. The side flanges are then upset, and shortened, to form the jaw members of the clevis. If desired, the web between these jaws need not be removed, but may be pressed into the side flanges during the upsetting process to provide additional reenforcing metal.

I claim:

1. The method of making connecting bars, consisting in forming a rolled metal H-beam with adjacent pairs of thickened portions in the side flanges at intervals corresponding to the length of a connecting bar, and dividing the beam into sections by cutting it transversely between each adjacent pair of thickened portions.

2. The method of making connecting bars, consisting in forming a rolled metal H-beam with adjacent pairs of thickened portions in the side flanges at intervals corresponding to the length of a connecting bar, dividing the beam into sections by cutting it transversely between each adjacent pair of thickened portions, and then removing the web between the thickened portions at the ends of the bars.

3. The method of making connecting bars, consisting in forming a rolled metal H-beam with adjacent pairs of thickened portions in the side flanges at intervals corresponding to the length of a connecting bar, and other thickened portions in the web just beyond the more remote ends of the thickened portions in the side flanges, dividing the beam into bars by cutting it transversely between each adjacent pair of thickened flange portions, and then removing the web between the ends of the bar and the thickened web portions.

4. In the manufacture of connecting bars, the step comprising forming an angle-beam with adjacent pairs of thickened portions therein at intervals corresponding to the length of the connecting bars.

5. In the manufacture of connecting bars, the step comprising rolling an angle-beam with adjacent pairs of thickened portions therein at intervals corresponding to the length of the connecting bars.

6. In the manufacture of connecting bars, the step comprising forming an H-beam with adjacent pairs of thickened portions in the side flanges at intervals corresponding to the length of a connecting bar.

7. In the manufacture of connecting bars, the step comprising forming an H-beam with adjacent pairs of thickened portions in the side flanges at intervals corresponding to the length of a connecting bar, and thickened portions in the web adjacent the more remote ends of the adjacent thickened flange portions.

8. In the art of forming connecting bars, the process of forming a continuous angle-beam as a series of similar connecting bars positioned end to end, with reenforced portions adjacent the ends of each bar.

9. In the art of forming connecting bars, the process of rolling a continuous angle-beam in the form of a series of similar connecting bars positioned end to end, with reenforced portions adjacent the ends of each bar.

10. In the art of making connecting bars, the process of rolling a continuous H-beam with integral reenforcements in the side-flanges at spaced intervals.

11. In the art of making connecting bars, the process of rolling a continuous H-beam with integral reenforcements in the web and side flanges at spaced intervals.

12. A connecting bar made from a single piece of angle-beam, comprising side flanges and a connecting web, there being thickened reenforcements rolled into the side flanges at each end of the bar and transverse reenforcements rolled into the web.

13. A connecting bar made from a single piece of angle-beam, comprising side flanges and a connecting web, there being thickened reenforcements rolled into the side flanges at one end of the bar, a transverse reenforcement rolled into the web adjacent the inner ends of the flange reenforcements, and the web being cut away between the reenforcements from the web reenforcement to the end of the bar.

14. A connecting bar made from a single piece of angle-beam, comprising side flanges and a connecting web, there being thickened reenforcements rolled into the side flanges at each end of the bar and transverse reenforcements rolled into the web, adjacent the inner ends of the flange reenforcements, the web being cut away between the reenforced portions of the side flanges from web reenforcements to the ends of the bar.

HARRY TEMPLE ANDERSON.

CERTIFICATE OF CORRECTION.

Patent No. 1,615,821.                                                                   granted February 1, 1927.

to HARRY TEMPLE ANDERSON.

It is hereby certified that error appears in the printed specification of the above mentioned patent requiring correction as follows: Page 1, line 49, before the word "apparent" insert the word "be"; page 3, line 33, claim 13, after the article "the" insert the word "flange", and line 44, claim 14, before the word "web" insert the article "the"; and that the said Letters Patent should be read with these corrections therein that the same may conform to the record of the case in the Patent Office.

Signed and sealed this 8th day of March, A. D. 1927.

Seal.                                                                                 M. J. Moore,
                                                                                      Acting Commissioner of Patents.